United States Patent
Jung et al.

(10) Patent No.: US 6,822,026 B2
(45) Date of Patent: Nov. 23, 2004

(54) FLAME-RETARDANT POLYPROPYLENE RESIN COMPOSITION

(75) Inventors: In Sik Jung, Daejun-Shi (KR); Jong Soo Hong, Daejun-Shi (KR); Man Seang Her, Daejun-Shi (KR); Won Beum Jung, Daejun-Shi (KR)

(73) Assignee: Sansung General Chemicals Co. (KR)

( * ) Notice: Subject to any disclaimer, the term of this patent is extended or adjusted under 35 U.S.C. 154(b) by 0 days.

(21) Appl. No.: 10/296,636

(22) PCT Filed: May 29, 2001

(86) PCT No.: PCT/KR01/00898

§ 371 (c)(1),
(2), (4) Date: Jul. 2, 2003

(87) PCT Pub. No.: WO01/92410

PCT Pub. Date: Dec. 6, 2001

(65) Prior Publication Data

US 2004/0014850 A1 Jan. 22, 2004

(30) Foreign Application Priority Data

May 29, 2000 (KR) .......................................... 2000-28965

(51) Int. Cl.$^7$ ...................... C08K 5/523; C08K 5/0533; C08K 3/32

(52) U.S. Cl. ...................... 524/141; 524/127; 524/140; 524/145; 524/387; 524/416

(58) Field of Search .......................... 524/127, 140–141, 524/145, 387, 416

(56) References Cited

FOREIGN PATENT DOCUMENTS

| JP | 5-320471 A | 12/1993 |
| JP | 7-53859 A | 2/1995 |
| JP | 11-147979 A | 6/1999 |

*Primary Examiner*—Peter Szekely
(74) *Attorney, Agent, or Firm*—Saliwanchik, Lloyd & Saliwanchik

(57) ABSTRACT

The present invention relates to a flame-retardant polypropylene resin composition comprising (A) polypropylene resin 20–60% by weight, (B) polyphenylene ether-based resin 1–50% by weight, (C) hydrogenated block copolymer of a vinylaromatic compound and conjugated diene, which mainly is based on vinylaromatic compound, 0.1–15% by weight, (D) aromatic phosphoric ester in phenol strucure 1–20% by weight, (E) polyammonium phosphate 1–20% by weight, and (F) pentaerythritol-based flame retardant auxiliary agent 0.1–13% by weight. The weight ratio of the aromatic phosphoric ester in phenol structure to the polyammonium phosphate is preferably 0.2–5.0. The composition has advanced flame-retardant and heat-resistant property, and processing property.

7 Claims, No Drawings

FLAME-RETARDANT POLYPROPYLENE RESIN COMPOSITION

This application is a National Stage Application of International Application Number PCT/KR01/00898, published pursuant to PCT Article 21(2).

TECHNICAL FIELD

The present invention relates to novel flame-retardant polypropylene resin compositions, which have been improved in incombustibility and other physical properties. More specifically, the present invention relates to incombustible polypropylene resin compositions prepared by dispersing polyphenylene ether-based resin, phosphorus flame-retardant and flame-retardant auxiliary agent in the major component, polypropylene resin in a specific ratio.

BACKGROUND ART

Since they have excellent processability, chemical resistance, weather resistance and mechanical strength, polypropylene resins have been widely used in various fields including household electrical appliances, building materials, interior decorative materials, automobile parts, etc. However, they need to be supplemented with a variety of organic or inorganic flame-retardants in order to obtain incombustibility required for these uses.

Exemplary incombustible polypropylene resin compositions containing such flame-retardants include compositions comprising polypropylene resin and hydrated inorganic compound such as magnesium hydroxide, aluminum hydroxide and hydrotalcite (See: Japanese Laid-open Publication Nos. 53-92855, 54-29350, 54-77658, 56-25954, 57-87462 and 60-110738); compositions comprising polypropylene resin, polyethylene resin with a melt index of 0.01~2.0, halogen compound (for example, decabromo-diphenyl ether or dodecachloro-dodecahydromethanodibenzocyclooctene), and inorganic filler selected from the group consisting of stone powder, kaolin, celestite, silica and diatomite (See: Japanese Laid-open Publication No. 55-30739); and compositions comprising polypropylene resin and either a reaction product, which is generated from a reaction between an aldehyde compound and a nitrogenous compound wherein =C=O (or =C=S or =NH) group is incorporated into ammonium phosphate (or amine phosphate) ring structure, or an oligomer (or polymer) of 1,3,5-triazine derivatives (See: Japanese Laid-open Publication Nos. 52-146452 and 59-147050).

However, the compositions, which were prepared by adding inorganic compound such as magnesium hydroxide to polypropylene resin so as to obtain highly incombustible resin composition, have been found to be poor in their plasticity. On the other hand, the compositions prepared by adding decabromo phenyl-based compound to polypropylene resin are relatively good in their plasticity and incombustibility, but are disadvantageous in that they generate poisonous gases during secondary processing or combustion.

In contrast, the compositions disclosed in Japanese Laid-open Publication Nos. 52-146452 and 59-147050 do not show the decline of secondary processing property as well as the production of corrosive and poisonous gases. Also, these compositions exhibit the incombustibility of V-0 at $1/16$ inch thickness when tested according to the vertical firing test protocol out of "COMBUSTIBILITY TESTS OF PLASTIC MATERIALS FOR MACHINE PARTS" of UL Subject 94(Underwriters Laboratories Incorporation). Nonetheless, these compositions are inferior in thermal resistance and impact strength, so they are unsuitable to be used in machine parts requiring these physical properties.

On the other hand, polyphenylene ether resins have been known as highly efficient plastics having excellent incombustibility, thermal resistance, size stability, non-hydroscopicity and electric properties. Therefore, an improved resin composition, which would advance in plasticity, impact resistance, thermal resistance and incombustibility and thus could be used in extensive areas, may be expected when mixing a polypropylene resin with a polyphenylene ether resin and thereby making up for each other's demerits and making use of each other's merits. For this reason, various polyolefin/polyphenylene ether-based polymer alloys have been vigorously proposed in the art. For example, U.S. Pat. No. 3,994,856 describes blending of polyphenylene ether with polystyrene-based hydrogenated block copolymer for the purpose of improving impact resistance and solvent resistance. U.S. Pat. No. 4,145,377 discloses thermoplastic resin compositions, which were enhanced in impact resistance and solvent resistance by blending either polyphenylene resin or a mixture of polyphenylene resin and styrene-based resin together with both a pre-mixture consisting of 20~80 weight parts of polyolefin and 80~20 weight parts of hydrogenated block copolymer and hydrogenated block copolymer. U.S. Pat. Nos. 4,166,055 and 4,239,673 teach improvement of impact resistance by blending polyphenylene ether with both hydrogenated block copolymer and polyolefin. Similarly, U.S. Pat. No. 4,383,082 and European Patent No. 115712 also teach improvement of impact resistance by blending polyphenylene ether with both polyolefin and hydrogenated block copolymer. Further, Japanese Laid-open Publication Nos. SHO 63-113058, SHO 63-225642, HEI 3-72512, HEI 4-183748 and HEI 5-320471, and U.S. Pat. No. 4,863,997 disclose resin compositions having advanced chemical resistance and processability, which were prepared by adding a particular hydrogenated block copolymer as a modifier to a blend of polyolefin resin and polyphenylene ether resin. In addition, Japanese Laid-open Publication No. HEI 7-53859 discloses incombustible resin compositions prepared by adding halogen-containing phosphoric ester compound and antimony compound to a blend of polyolefin resin and polyphenylene ether resin.

The polymer alloy compositions obtained from the above prior arts provide improved resin compositions, which take advantages of polyolefin resin and polyphenylene ether resin concerning thermal resistance, mechanical strength and processability. However, these polymer alloy compositions are still poor in incombustibility, and therefore require a large amount of flame-retardant, which results in significant decrease in mechanical strength. Meanwhile, Japanese Laid-Open Publication No. HEI 11-140245 describes preparation of thermoplastic incombustible resin compositions by adding an aromatic phosphoric ester compound and a 1,3,5-triazine-based nitrogenous compound to a blend of polyphenylene ether resin and hydrogenated copolymer. In our test, however, these compositions did not succeed in showing incombustibility of UL94 V-0, and were found to have difficulties in ensuring practical thermal resistance because of steep decrease in thermal resistance.

DISCLOSURE OF THE INVENTION

A feature of the present invention is to solve those problems of the prior arts and to provide novel flame-retardant polypropylene resin compositions, which have been improved in incombustibility as well as in any other physical properties by mixing polypropylene resin with polyphenylene ether-based resin having hindered phenol structure, aromatic phosphoric ester having hindered phenol structure and polyammonium phosphate as a condensed phosphate, in a specific ratio, and further adding pentaerythritol as a flame-retardant auxiliary agent thereto.

Briefly, according to the present invention, there is provided flame-retardant polypropylene resin compositions comprising (A) polypropylene resin, which is the major component of the composition, 20~69% by weight, (B) polyphenylene ether-based resin 1~50% by weight, (C) hydrogenated block copolymer, which is mainly based on aromatic vinyl compound, 0.1~15% by weight, (D) aromatic phosphoric ester in phenol structure 1~20% by weight, (E) polyammonium phosphate 1~20% by weight, and (F) pentaerythritol-based flame-retardant auxiliary agent 0.1~13% by weight.

As used herein, "polypropylene" refers to propylene homopolymer as well as propylene olefin block copolymer containing 50 wt. % or more propylene unit.

In the resin compositions of the present invention, the polypropylene resin (A) may be crystalline polypropylene homopolymer, or crystalline copolymer consisting of propylene and one or more compounds selected from the group consisting of ethylene, 1-butene, 1-pentene, 1-hexene, 4-methylpentene, 1-heptene, 1-octene and 1-decene. Melt index of the polypropylene resin is in the range of 0.3~100 g/10 min (230° C., 2.16 kg), preferably 0.5~40 g/10 min. If the melt index of the polypropylene resin is below 0.3 g/10 min, defects in appearance, such as a flow mark on the surface of the molding product, occurs in the course of injection molding. Conversely, if the melt index of the polypropylene resin is over 100 g/10 min, impact resistance of the molding product becomes lower suddenly.

According to the present invention, any of the crystalline polypropylene resins can be used regardless of its stereoregularity. However, crystalline polypropylene having an isotactic pentad fraction of preferably 0.80~0.99, more preferably 0.85~0.99, and most preferably 0.90~0.99 is preferred.

In the resin compositions of the present invention, amount of the polypropylene resin (A) is 20~69% by weight, and preferably 25~63% by weight. If the polypropylene resin content is less than 20% by weight, plasticity and solvent resistance of the resin composition are inferior in spite of relatively superior thermal resistance. Conversely, if the polypropylene resin content is more than 69% by weight, thermal resistance of the resin composition is inferior in spite of relatively superior plasticity and solvent resistance, and thus the composition cannot be used as thermal resistant materials.

According to the present invention, the polyphenylene ether-based resin (hereinafter, referred to as "PPE") (B) is an essential component which provides thermal resistance and incombustibility to the resin compositions of the present invention. The polyphenylene ether-based resin is made from hindered phenol monomers. The polyphenylene ether-based resin is one or more selected from the group consisting of poly(2,6-dimethyl-1,4-phenylene)ether, poly(2,6-diethyl-1,4-phenylene)ether, poly(2,6-dipropyl-1,4-phenylene) ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene) ether, and copolymer of poly(2,6-diethyl-1,4-phenylene) ether and poly(2,3,6-trimethyl-1,4-phenylene)ether. Preferably, poly(2,6-dimethyl-1,4-phenylene)ether is used. Polymerization degree of the polyphenylene ether resin is not specifically limited, but the resin having an inherent viscosity of 0.2~0.8(measured in chloroform solvent at 25° C.) is preferred considering thermal stability and processability of the resin composition.

In the resin compositions of the present invention, amount of the polyphenylene ether-based resin (B) is 1~50% by weight, preferably 5~45% by weight. If the polyphenylene ether-based resin content is over 50% by weight, thermal resistance of the resin composition is excellent but plasticity and solvent resistance are poor. Conversely, if the polyphenylene ether-based resin content is below 1% by weight, plasticity and solvent resistance of the resin composition are increased but incombustibility and impact resistance are decreased.

The hydrogenated block copolymer (C) based on vinyl aromatic compound (hereinafter, referred to as "hydrogenated block copolymer) has a structure of A-B-A-B-A, wherein Block A corresponds to a polymer block based on one or more vinyl aromatic compounds, and Block B corresponds to a conjugated diene block based on one or more conjugated diene compounds, wherein 45% or more of the conjugated diene compounds are linked to the vinyl. This hydrogenated block copolymer plays a role in evenly dispersing the polyphenylene ether-based resin (B) in the polypropylene resin (A).

The vinyl aromatic compounds constituting such hydrogenated block copolymer, for example, can be one or more selected from the group consisting of styrene, α-methyl styrene, vinyl toluene, P-tert-butyl styrene and diphenyl ethylene, and styrene is preferred. The hydrogenated block copolymer is also commercially available. For example, Tuftec H1052 can be obtained from Asahi Chemicals Co., Ltd.

In the resin compositions of the present invention, amount of the hydrogenated block copolymer (C) is 0.1~15% by weight, preferably 2~10% by weight. If the hydrogenated block copolymer is contained over 15% by weight, thermal resistance of the resin composition is decreased. On the contrary, if the hydrogenated block copolymer is contained below 0.1% by weight, impact resistance of the resin composition is reduced due to failure in the efficient dispersion of the polyphenylene ether-based resin in the polypropylene matrix.

The aromatic phosphoric ester (D) used in the present invention, which has phenol structure, can be exemplified by triphenyl phosphate, and other aromatic phosphoric ester compounds having hindered phenol structure such as tri(2,6-dimethylphenyl)phosphate, tri(2,6-ditertiarybutylphenyl) phosphate, etc. Such phosphoric ester compound can be used solely or as a mixture. According to the present invention, use of a phosphoric ester compound having a molecular weight over 1500 should be avoided, because it hardly improves the incombustibility of the resin composition. Preferably, phosphoric ester having a melting point of 80° C. or more is used.

The polyammonium phosphate (E) used in the present invention is advantageous in that: it produces not erosive gases, halogen gases and toxic gases, but nonflammable gases (water vapor, $CO_2$, $N_2$, etc.) and carbonaceous residue when degraded by contact with high temperature condition or flame. As the polyammonium phosphate, commercially available products, including Budit3076(Budenheim Co., Ltd.), SUMISAFE P (Sumitomo Chemicals Co., Ltd.) and Exolit422(Hoechst Co., Ltd.), can be used. Further, the polyammonium phosphate can be used with melamine added and/or attached thereto. This melamine-added polyammonium phosphate can be purchased from Chisso Co., Ltd. in the brand name of Teraju C-60.

According to the present invention, the aromatic phosphoric ester compound having phenol structure and the polyammonium phosphate, in combination, serve as flame-retardants. At this time, weight ratio of the aromatic phosphoric ester compound to the polyammonium phosphate is preferably 0.20~5.0, more preferably 0.33~3.0. If the weight ratio is out of this range, desired flame-retardant effect cannot be accomplished and therefore a large amount of flame-retardant is required. In the resin compositions of the present invention, total amount of the aromatic phosphoric ester compound and the polyammonium phosphate should be in the range of preferably 15~30% by weight, more preferably 18~25% by weight. If the total amount is below 15% by weight, sufficient flame-retardant effect cannot be obtained. On the other hand, if the total amount exceeds 30% by weight, thermal resistance of the resin composition significantly decreases.

The pentaerythritol-based compound (F), which is used as a flame-retardant auxiliary agent in the present invention, can be represented by the following formula (I):

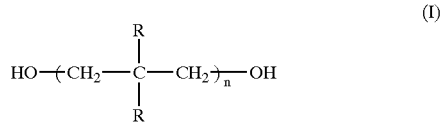

(I)

In the above formula (I), R is —CH$_2$OH, and n is an integer ranging from 1 to 5.

The pentaerythritol-based compound serves as a char promoter, which helps generation of char during combustion. For this purpose, dipentaerythritol or tripentaerythritol can be used. In the case that pentaerythritol is used, its content of the resin composition is 0.1~13% by weight, preferably 3~12% by weight. If the content is less than 0.1% by weight, pentaerythritol cannot function as a flame-retardant auxiliary agent. Conversely, if the content is more than 13% by weight, thermal resistance of the resin composition declines significantly.

To the resin compositions of the present invention may be added further additives such as plasticizer, thermal stabilizer, antioxidant and light stabilizer. Organic or inorganic pigment and dye; inorganic filler such as talc, silica and glass fiber; and flame-retardant auxiliary agent such as melamine and 1,3,5-triazine-based nitrogenous compounds can be also added to the resin compositions of the present invention.

The resin compositions of the present invention are characterized in that: (i) they produce no poisonous gases, which have been considered as an inevitable problem accompanied by the use of the conventional flame-retardant; (ii) they show excellent incombustibility of UL94 V-0; and (iii) they have been enhanced in mechanical strength, such as impact resistance and heat resistance, and processability.

The resin compositions of the present invention can be prepared by the process as follows: polypropylene resin (A), polyphenylene ether-based resin (B), hydrogenated block copolymer (C) based on aromatic vinyl compounds, aromatic phosphoric ester (D) having phenol structure, polyammonium phosphate (E), pentaerythritol (F) having the structure of formula (I), and the above mentioned various additives are filled in an agitating and mixing apparatus (for example, Hensel mixer, super mixer or tumbler mixer) in specified amounts, and mixed with agitating for 1~10 min, and then melted and mixed at 200~290° C. by using a rolling mill or an extruder to provide pellets.

BEST MODE FOR CARRYING OUT THE INVENTION

The present invention can be more clearly understood with referring to the following examples. It should be understood that the following examples are not intended to restrict the scope of the present invention in any manner.

Measuring Protocols

1) Izod Impact Strength

Izod impact strength was measured according to the test standard ASTM D256 by using test pieces (3.2 mm in thickness) produced by injection molding.

2) Heat Deflection Temperature

Heat deflection temperature was measured according to the 18.5 kgf high load protocol of the test standard ASTM D648 by using test pieces (127.0 mm in length, 12.7 mm in width, 6.4 mm in thickness) produced by injection molding.

3) Incombustibility

Incombustibility was measured according to the vertical firing test (V-0) protocol out of "COMBUSTIBILITY TESTS OF PLASTIC MATERIALS FOR MACHINE PARTS" of UL Subject 94(Underwriters Laboratories Incorporation). Thickness of the test pieces was 1/12 inch.

EXAMPLE 1

In a Hensel mixer were filled 4.0 kg of polypropylene resin, i.e., crystalline ethylene-propylene block copolymer having a melt index (flow amount of melted resin measured for 10 min at 230° C. under a load of 2.16 kg) of 0.5 g/10 min, 3 kg of polyphenylene ether resin, 500 g of hydrogenated block copolymer based on aromatic vinyl compounds, 1 kg of triphenylphosphate, 1 kg of polyammonium phosphate, 500 g of pentaerythritol, and 10 g of calcium stearate as an additive, and then mixed for 3 min with agitating. The resulting mixture was melted and extruded through an extruder of 30 mm-caliber at 200~260° C. to provide pellets.

EXAMPLES 2~3 AND COMPARATIVE EXAMPLES 1~4

The same component compounds as in Example 1 were filled in a Hensel mixer, except varying the respective amount of the aromatic phosphoric ester having phenol structure and the polyammonium phosphate as shown in Table 1. Then, they were mixed with agitating, and the resulting mixture was melted and extruded under the same condition as in Example 1 to provide pellets.

The pellets obtained from Examples 1~3 and Comparative examples 1~4 were dried for 3 hrs at 100° C., and then molded through an injection molding machine, wherein maximum temperature of its cylinder had been adjusted to 230° C., to provide test pieces. The test pieces were subjected to the tests for incombustibility and physical properties as described above. The results are shown in Table 1.

As can be seen from Table 1, all of Examples 1~3, which were prepared according to the present invention, exhibited a heat deflection temperature over 80° C. as well as excellent incombustibility of V-0. On the contrary, all of Comparative examples 1~4 exhibited excellent thermal resistance, but failed to achieve the incombustibility of V-0.

TABLE 1

(unit: 100 g)

|  | Example 1 | Example 2 | Example 3 | Comparative example 1 | Comparative example 2 | Comparative example 3 | Comparative example 4 |
|---|---|---|---|---|---|---|---|
| (A) | 40 | 40 | 40 | 40 | 40 | 40 | 40 |
| (B) | 30 | 30 | 30 | 30 | 30 | 30 | 30 |
| (C) | 5 | 5 | 5 | 5 | 5 | 5 | 5 |
| (D)-1 | 10 | 3.5 | 16.5 | — | 2 | 18 | 20 |
| (D)-2 | — | — | — | — | — | — | — |
| (E)-1 | 10 | 16.5 | 3.5 | 20 | 18 | 2 | — |
| (E)-2 | — | — | — | — | — | — | — |
| (F) | 5 | 5 | 5 | 5 | 5 | 5 | 5 |
| (G)-1 | — | — | — | — | — | — | — |
| (G)-2 | — | — | — | — | — | — | — |
| Izod impact strength (kg · cm/cm) | 14 | 11 | 8 | 6 | 8 | 20 | 23 |
| Heat deflection temperature (° C.) | 91 | 93 | 86 | 97 | 95 | 83 | 80 |
| Bending elastic modulus (kg/cm$^2$) | 16350 | 16750 | 15400 | 17200 | 16800 | 13200 | 11250 |
| Incombustibility | V-0 | V-0 | V-0 | complete combustion | complete combustion | complete combustion | complete combustion |
| Processability | ○ | ○ | ○ | ○ | ○ | ○ | ○ |

[Notes]
Component (A): polypropylene resin(brand name: BB110P; Samsung General Chemicals Co., Ltd.)
Component (B): polyphenylene ether resin having hindered phenol structure(brand name: P-401[poly(2,6-dimethyl-1,4-phenylene)ether]; Asahi Kasei Co., Ltd., Japan)
Component (C): hydrogenated block copolymer based on aromatic vinyl compounds(brand name: Tuftec H1052; Asahi Kasei Co., Ltd., Japan)
Component (D)-1: Aromatic phosphoric ester having phenol structure(brand name: TPP[triphenylphosphate]; Daihachi Co. Ltd., Japan)
Component (D)-2: Aromatic phosphoric ester having hindered phenol structure(brand name: PX-200[tri(2,6-dimethylphenyl)phosphate]; Daihachi Co., Ltd., Japan)
Component (E)-1: polyammonium phosphate(brand name: Budit 3076; Budenheim Co., Ltd., Sweden)
Component (E)-2: melamine-coated polyammonium phosphaste(brand name: Teraju C-60; Chisso Co., Ltd., Japan)
Component (F): pentaerythritol(brand name: PER; Eujin Chemicals Co., LTD.)
Component (G)-1: nitrogenous compound(brand name: melamine; Samsung Fine Chemicals, Co., Ltd.)
Component (G)-2: nitrogenous compound, melamine cyanurate(brand name: MC610; Nissan Chemicals Co., Ltd., Japan)

EXAMPLE 4

In a Hensel mixer were filled 3.7 kg of polypropylene resin, i.e., crystalline ethylene-propylene block copolymer having a melt index (flow amount of melted resin measured for 10 min at 230° C. under a load of 2.16 kg) of 0.5 g/10 min, 3 kg of polyphenylene ether resin, 500 g of hydrogenated block copolymer based on aromatic vinyl compounds, 500 g of triphenylphosphate, 1 kg of polyammonium phosphate, 1.3 kg of pentaerythritol, and 10 g of calcium stearate as an additive, and then mixed for 3 min with agitating. The resulting mixture was melted and extruded through an extruder of 30 mm-caliber at 200~260° C. to provide pellets.

EXAMPLES 5~6 AND COMPARATIVE EXAMPLE 5

The same component compounds as in Example 4 were filled in a Hensel mixer, except varying the respective amount of the polypropylene resin and the pentaerythritol as shown in Table 2. Then, they were mixed with agitating, and the resulting mixture was melted and extruded under the same condition as in Example 1 to provide pellets.

The pellets obtained from Examples 4~6 and Comparative example 5 were dried for 3 hrs at 100° C., and then molded through an injection molding machine, wherein maximum temperature of its cylinder had been adjusted to 230° C., to provide test pieces. The test pieces were subjected to the tests for incombustibility and physical properties as described above. The results are shown in Table 2.

As can be seen from Table 2, all of Examples 4~6, which were prepared according to the present invention to contain pentaerythritol, exhibited a heat deflection temperature over 80° C. as well as excellent incombustibility of V-0. On the contrary, Comparative example 5 exhibited excellent thermal resistance, but failed to achieve the incombustibility of V-0. These results suggested that pentaerythritol played an important role as a flame-retardant auxiliary agent.

TABLE 2

(unit: 100 g)

|  | Example 4 | Example 5 | Example 6 | Comparative example 5 |
|---|---|---|---|---|
| (A) | 37 | 44.9 | 32 | 42 |
| (B) | 30 | 30 | 30 | 30 |
| (C) | 5 | 5 | 5 | 5 |
| (D)-1 | 5 | 10 | 20 | 10 |
| (D)-2 | — | — | — | — |
| (E)-1 | 10 | 10 | 10 | 13 |
| (E)-2 | — | — | — | — |
| (F) | 13 | 0.1 | 3 | — |
| (G)-1 | — | — | — | — |
| (G)-2 | — | — | — | — |
| Izod impact strength (kg · cm/cm) | 16 | 17 | 12 | 20 |
| Heat deflection temperature (° C.) | 89 | 97 | 98 | 99 |
| Bending elastic modulus (kg/cm$^2$) | 15800 | 17300 | 16900 | 16500 |

TABLE 2-continued

| | Example 4 | Example 5 | Example 6 | (unit: 100 g) Comparative example 5 |
|---|---|---|---|---|
| Incombustibility | V-0 | V-0 | V-0 | complete combustion |
| Processability | ○ | ○ | ○ | ○ |

EXAMPLE 7

In a Hensel mixer were filled 4.0 kg of polypropylene resin, i.e., crystalline ethylene-propylene block copolymer having a melt index (flow amount of melted resin measured for 10 min at 230° C. under a load of 2.16 kg) of 0.5 g/10 min, 3 kg of polyphenylene ether resin, 500 g of hydrogenated block copolymer based on aromatic vinyl compounds, 1 kg of triphenylphosphate, 1 kg of melamine-coated polyammonium phosphate, 500 g of pentaerythritol, and 10 g of calcium stearate as an additive, and then mixed for 3 min with agitating. The resulting mixture was melted and extruded through an extruder of 30 mm-caliber at 200~260° C. to provide pellets.

EXAMPLES 8~9 AND COMPARATIVE EXAMPLES 6~8

The same component compounds as in Example 7 were filled in a Hensel mixer, except varying amount of polypropylene resin, kind and amount of aromatic phosphoric ester having phenol structure, and kind and amount of polyammonium phosphate as shown in Table 3. Then, they were mixed with agitating, and the resulting mixture was melted and extruded under the same condition as in Example 1 to provide pellets.

The pellets obtained from Examples 7~9 and Comparative examples 6~8 were dried for 3 hrs at 100° C., and then molded through an injection molding machine, wherein maximum temperature of its cylinder had been adjusted to 230° C., to provide test pieces. The test pieces were subjected to the tests for incombustibility and physical properties as described above. The results are shown in Table 3.

As can be seen from Table 3, whether the phosphoric ester compound had a phenol structure or a hindered phenol structure, all of Examples 7~9 prepared according to the present invention exhibited a heat deflection temperature over 80° C. as well as excellent incombustibility of V-0. On the contrary, all of Comparative examples 6~8 containing no flame-retardant auxiliary agent, pentaerythritol, failed to achieve the incombustibility of V-0, though they contained the flame-retardants, phosphoric ester having phenol structure and polyammonium phosphate. Moreover, addition of a nitrogenous compound as an alternative flame-retardant auxiliary agent did not help to ensure the incombustibility of V-0.

TABLE 3

| | Example 7 | Example 8 | Example 9 | Comparative example 6 | Comparative example 7 | (unit: 100 g) Comparative example 8 |
|---|---|---|---|---|---|---|
| (A) | 40 | 40 | 40 | 35 | 35 | 35 |
| (B) | 30 | 30 | 30 | 30 | 30 | 30 |
| (C) | 5 | 5 | 5 | 5 | 5 | 5 |
| (D)-1 | 10 | — | — | 10 | 20 | — |
| (D)-2 | — | 10 | 10 | — | — | — |
| (E)-1 | — | 10 | — | 10 | — | 20 |
| (E)-2 | 10 | — | 10 | — | — | — |
| (F) | 5 | 5 | 5 | — | — | — |
| (G)-1 | — | — | — | 10 | — | — |
| (G)-2 | — | — | — | — | 10 | 10 |
| Izod impact strength (kg · cm/cm) | 20 | 21 | 26 | 12 | 13 | 9 |
| Heat deflection temperature (° C.) | 93 | 98 | 100 | 102 | 92 | 104 |
| Bending elastic modulus (kg/cm²) | 17200 | 16800 | 16900 | 19100 | 15400 | 19700 |
| Incombustibility | V-0 | V-0 | V-0 | complete combustion | complete combustion | V-1 |
| Processability | ○ | ○ | ○ | ○ | ○ | ○ |

EXAMPLE 10

In a Hensel mixer were filled 2.0 kg of polypropylene resin, i.e., crystalline ethylene-propylene block copolymer having a melt index (flow amount of melted resin measured for 10 min at 230° C. under a load of 2.16 kg) of 0.5 g/10 min, 5.0 kg of polyphenylene ether resin, 500 g of hydrogenated block copolymer based on aromatic vinyl compounds, 1 kg of triphenylphosphate, 1 kg of melamine-coated polyammonium phosphate, 500 g of pentaerythritol, and 10 g of calcium stearate as an additive, and then mixed for 3 min with agitating. The resulting mixture was melted and extruded through an extruder of 30 mm-caliber at 200~260° C. to provide pellets.

EXAMPLE 11 AND COMPARATIVE EXAMPLES 9~10

The same component compounds as in Example 10 were filled in a Hensel mixer, except varying the respective amount of the polypropylene resin and the polyphenylene ether resin as shown in Table 4. Then, they were mixed with agitating, and the resulting mixture was melted and extruded under the same condition as in Example 1 to provide pellets.

The pellets obtained from Examples 10~11 and Comparative examples 9~10 were dried for 3 hrs at 100° C., and then molded through an injection molding machine, wherein maximum temperature of its cylinder had been adjusted to 230° C., to provide test pieces. The test pieces were subjected to the tests for incombustibility and physical properties as described above. The results are shown in Table 4.

As can be seen from Table 4, all of Examples 10~11, which were prepared according to the present invention to contain an adequate amount of polyphenylene ether resin, showed excellent thermal resistance and impact resistance, and the incombustibility of V-0. On the other hand, in the case that the polyphenylene ether resin was added over 50% by weight, excessive extrusion load and injection load, and consequently, poor plasticity were resulted. Conversely, in the case that no polyphenylene ether resin was added, incombustibility was too lowered to achieve the incombustibility of V-0.

TABLE 4

|  | Example 10 | Example 11 | Comparative example 9 | Comparative example 10 |
|---|---|---|---|---|
| (A) | 20 | 69 | 15 | 70 |
| (B) | 50 | 1 | 55 | — |
| (C) | 5 | 5 | 5 | 5 |
| (D)-1 | 10 | 10 | 10 | 10 |
| (D)-2 | — | — | — | — |
| (E)-1 | 10 | 10 | 10 | 10 |
| (E)-2 | — | — | — | — |
| (F) | 5 | 5 | 5 | 5 |
| (G)-1 | — | — | — | — |
| (G)-2 | — | — | — | — |
| Izod impact strength (kg · cm/cm) | 24 | 11 | 20 | 5 |
| Heat deflection temperature (° C.) | 104 | 80 | 107 | 69 |
| Bending elastic modulus (kg/cm$^2$) | 17100 | 13200 | 14200 | 13600 |
| Incombustibility | V-0 | V-0 | V-0 | V-1 |
| Processability | ◯ | ◯ | X | ◯ |

(unit: 100 g)

As can be seen in the above Examples and Comparative examples, the polypropylene resin compositions of the present invention have so good incombustibility as to exhibit the incombustibility of UL94 V-0. In addition, they produce no erosive or poisonous gases during molding or combustion. Finally, they have been highly improved in physical properties including impact strength and thermal resistance, as well as in size stability. Therefore, they are useful for preparation of electrical appliances, automobile parts, building materials, interior decorative materials, etc., which basically require these properties.

What is claimed is:

1. An flame-retardant polypropylene resin composition comprising (A) polypropylene resin 20~69% by weight, (B) polyphenylene ether-based resin 1~50% by weight, (C) hydrogenated block copolymer, which is mainly based on aromatic vinyl compound, 0.1~15% by weight, (D) aromatic phosphoric ester having phenol structure 1~20% by weight, (E) polyammonium phosphate 1~20% by weight, and (F) pentaerythritol-based flame-retardant auxiliary agent 0.1~13% by weight, wherein the weight ratio of the aromatic phosphoric ester having phenol structure to the polyammonium phosphate is in the range of 0.2~5.0.

2. The flame-retardant polypropylene resin composition according to claim 1, wherein the polypropylene resin is crystalline polypropylene homopolymer, or one or more compounds selected from the group consisting of propylene olefin block copolymers including ethylene, 1-butene, 1-pentene, 1-hexene, 4-methylpentene, 1-heptene, 1-octene and 1-decene.

3. The flame-retardant polypropylene resin composition according to claim 1, wherein melt index of the polypropylene resin is in the range of 0.3~100 g/10 min.

4. The flame-retardant polypropylene resin composition according to claim 1, wherein isotactic pentad fraction of the polypropylene resin is in the range of 0.80~0.99.

5. The flame-retardant polypropylene resin composition according to claim 1, wherein the polyphenylene ether-based resin is one or more compounds selected from the group consisting of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene)ether, and copolymer of poly(2,6-diethyl-1,4-phenylene)ether and poly(2,3,6-trimethyl-1,4-phenylene)ether.

6. The flame-retardant polypropylene resin composition according to claim 1, wherein the total amount of the aromatic phosphoric ester having phenol structure and the polyammonium phosphate is in the range of 15~30% by weight.

7. The flame-retardant polypropylene resin composition according to claim 1, wherein the pentaerythritol is represented by the following formula (I):

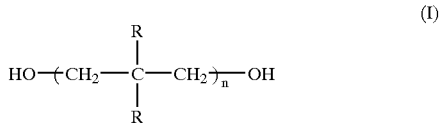

(I)

In the above formula (I), R is —CH$_2$OH, and n is an integer ranging from 1 to 5.

* * * * *